United States Patent
Caldwell et al.

(10) Patent No.: US 6,421,673 B1
(45) Date of Patent: Jul. 16, 2002

(54) METHOD FOR MAPPING APPLICATIONS AND OR ATTRIBUTES IN A DISTRIBUTED NETWORK ENVIRONMENT

(75) Inventors: R. Russell Caldwell, Atlanta; Michael C. Merrill, Marietta; Michael L. Greene, Dunwoody; Roy G. Wells, Griffin, all of GA (US)

(73) Assignee: Novient, Inc., Atlanta, GA (US)

( * ) Notice: Subject to any disclaimer, the term of this patent is extended or adjusted under 35 U.S.C. 154(b) by 0 days.

(21) Appl. No.: 09/459,734

(22) Filed: Dec. 13, 1999

(51) Int. Cl.[7] .............................................. G06F 17/30
(52) U.S. Cl. ......................... 707/10; 707/513; 707/529
(58) Field of Search ............................ 707/10, 500.1, 707/513, 529; 709/200, 208

(56) References Cited

U.S. PATENT DOCUMENTS

| | | | |
|---|---|---|---|
| 4,891,785 A | 1/1990 | Donohoo | 364/900 |
| 5,406,557 A | 4/1995 | Baudoin | 370/61 |
| 5,710,918 A | 1/1998 | Lagarde et al. | 395/610 |
| 5,742,762 A | 4/1998 | Scholl et al. | 395/200.3 |
| 5,790,790 A | 8/1998 | Smith et al. | 395/200.36 |
| 5,838,916 A | 11/1998 | Domenikos et al. | 395/200.49 |
| 5,852,712 A | 12/1998 | Allen et al. | 395/182.03 |
| 5,909,545 A | 6/1999 | Frese et al. | 395/200.38 |
| 6,266,666 B1 * | 7/2001 | Van Couvering | 707/10 |
| 6,266,701 B1 * | 7/2001 | Sridhar et al. | 709/232 |
| 6,295,536 B1 * | 9/2001 | Sanne | 707/10 |
| 6,327,574 B1 * | 12/2001 | Kramer et al. | 705/14 |
| 6,356,933 B2 * | 3/2002 | Mitchell et al. | 709/203 |

* cited by examiner

*Primary Examiner*—Safet Metjahic
*Assistant Examiner*—Haythim Alaubaidi
(74) *Attorney, Agent, or Firm*—Morris, Manning & Martin, LLP

(57) ABSTRACT

A disclosed method includes mapping at least one local application module to respective message type data, and storing the message type data in association with the local application module in a local database accessible to a local server. The method includes mapping gateway account data for internetwork access to at least one remote database, to respective message type data. The first method further includes storing the message type data in association with respective gateway account data in the local database, mapping remote attribute data to local attribute data, and storing the remote attribute data in association with the local attribute data in the local database. Similar steps can be used to prepare the remote server and database for operation. Using the local client device a user can generate message type data transmitted from the local client device to the local server that determines whether the received message type data is associated with a local application module. If so, the local server runs the local application module using optional attribute data. The local server also determines whether the received message type data is associated with gateway account data. If so, the gateway account data is used to transmit the message type data from the local server over the internetwork to the remote server. The remote server determines whether the message type data is mapped to a remote application module in the remote database. If so, the remote server runs a remote application module corresponding to the message type data.

28 Claims, 13 Drawing Sheets

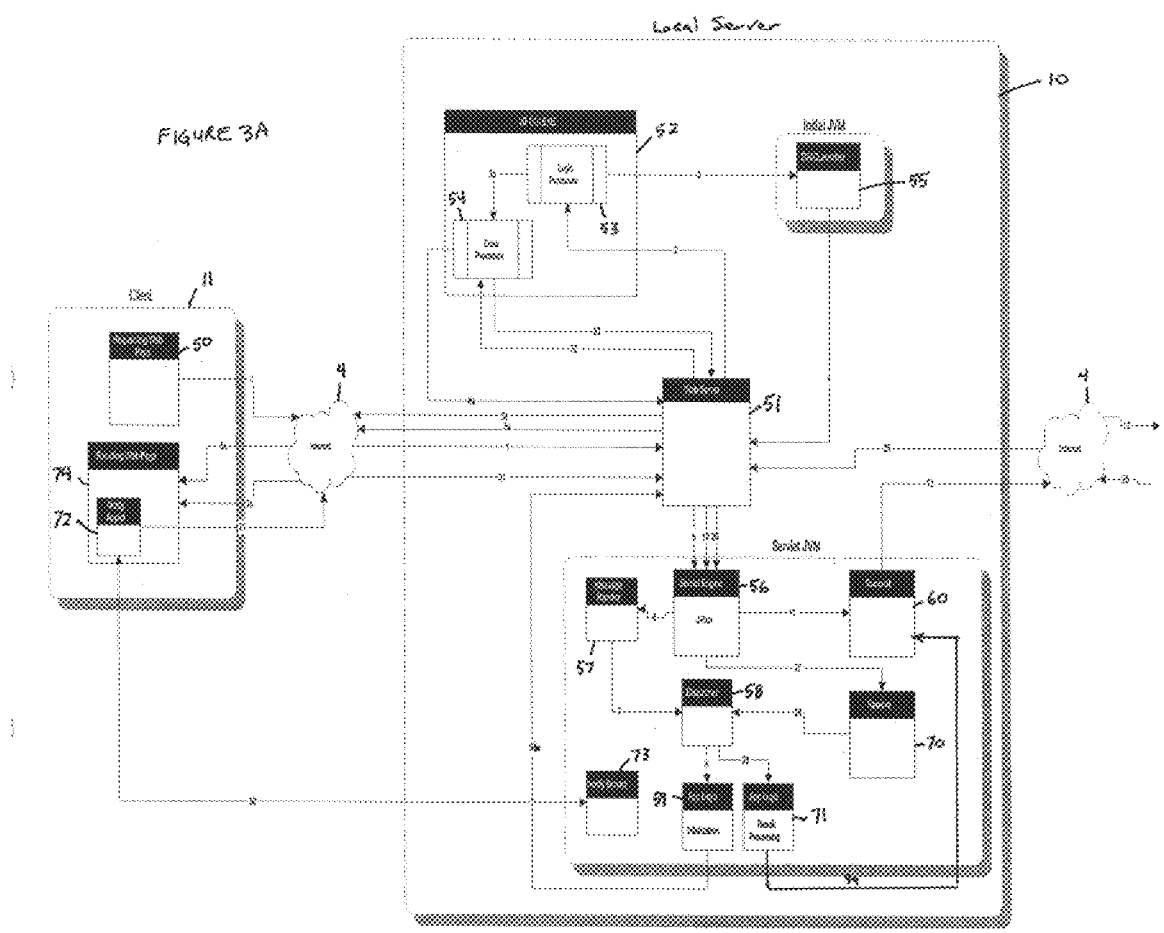

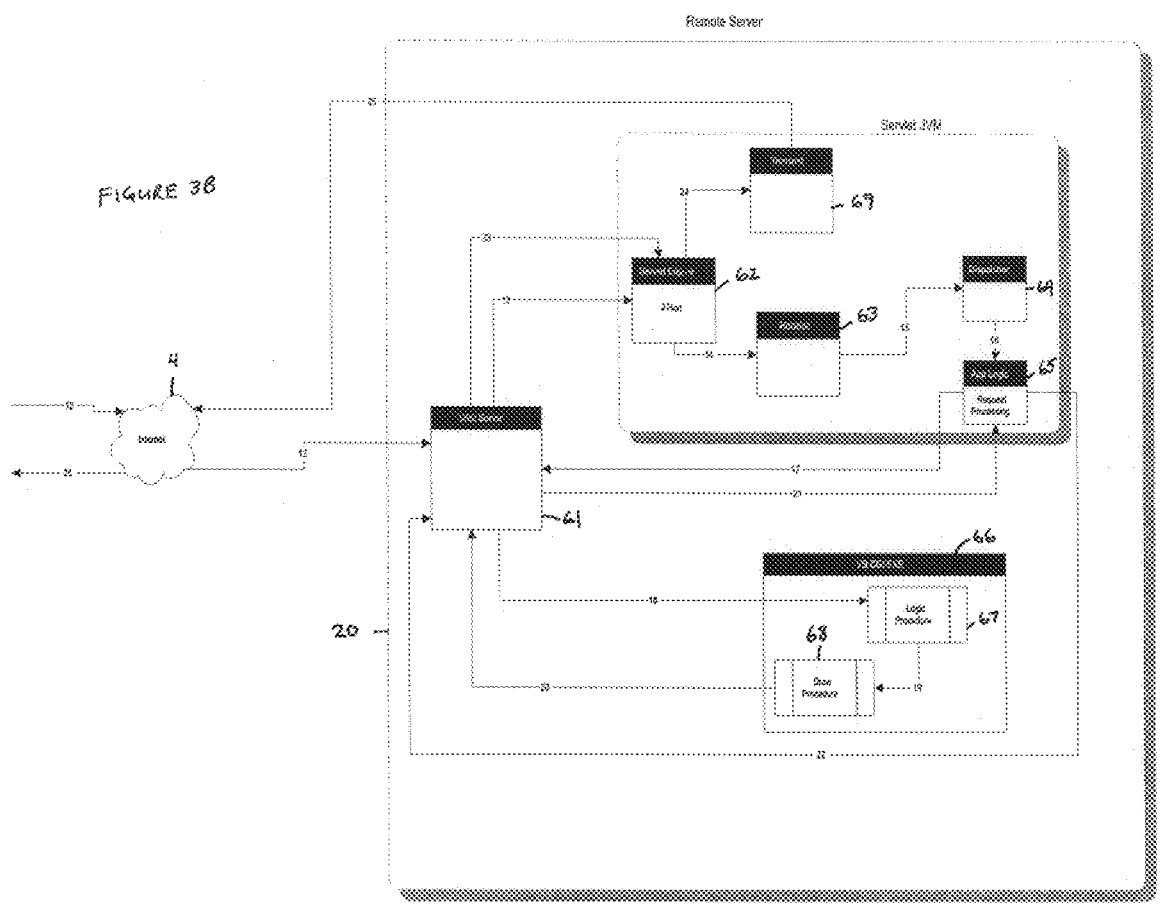

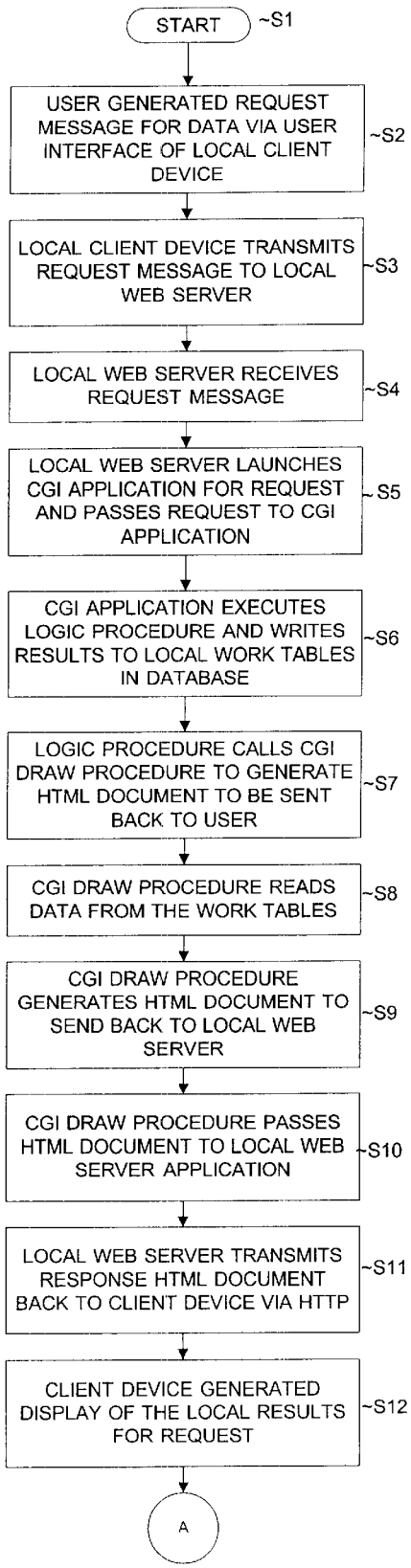

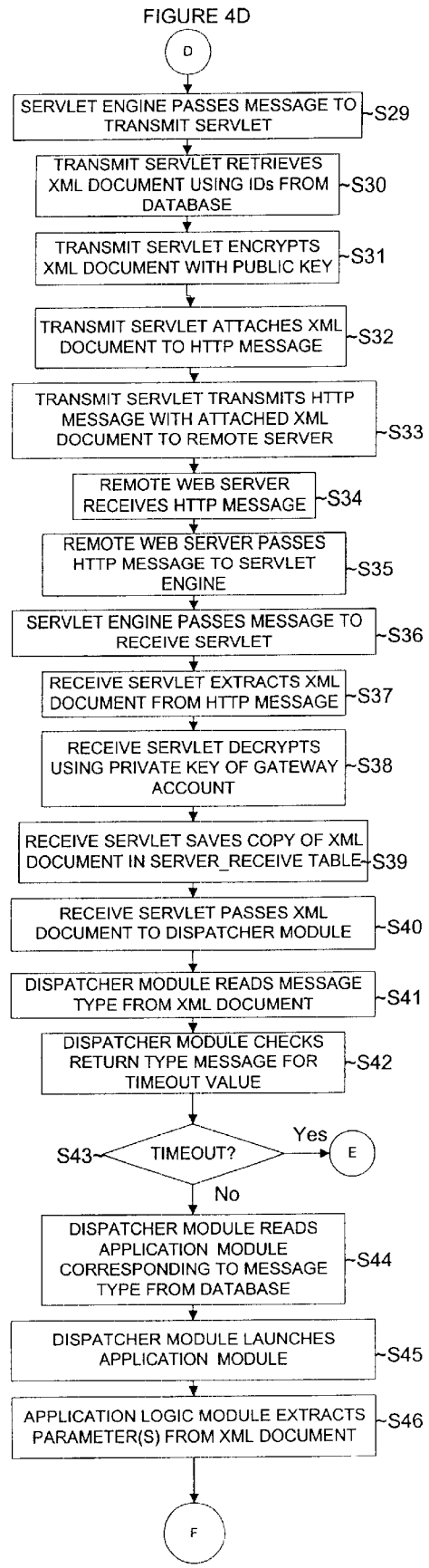

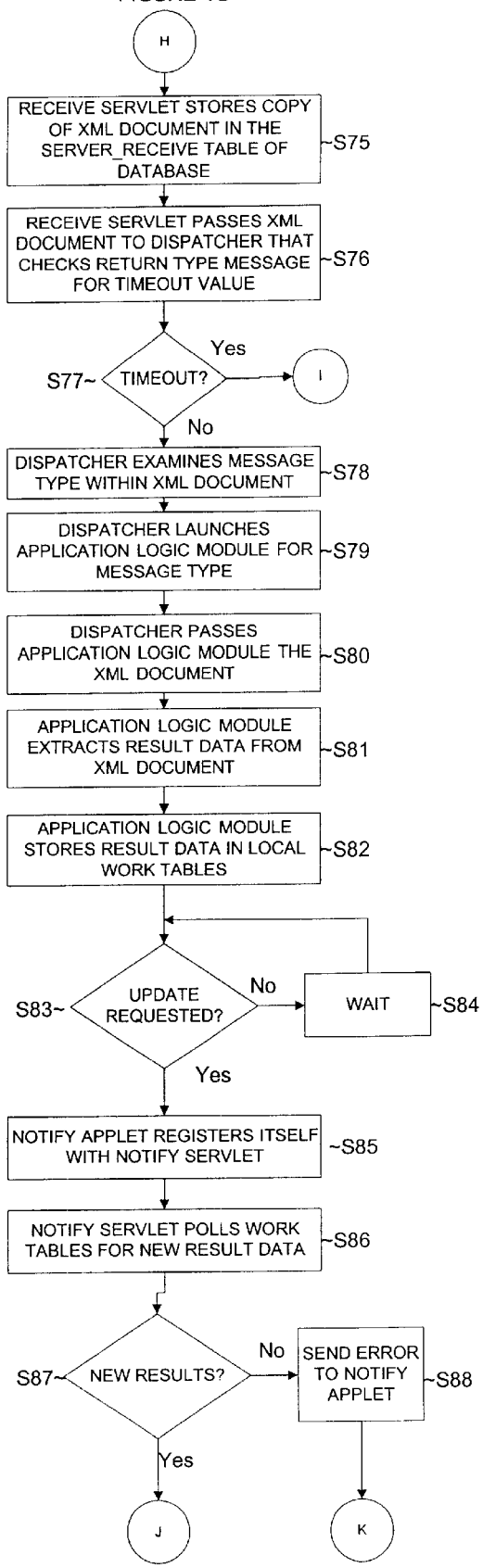

METHOD FOR MAPPING APPLICATIONS AND OR ATTRIBUTES IN A DISTRIBUTED NETWORK ENVIRONMENT

COPYRIGHT AUTHORIZATION

A portion of the disclosure of this patent document contains material that is subject to copyright protection. Permission is hereby given by the owner, Novient, Inc., Atlanta, Ga., binding upon its successors and assigns, to reproduce, distribute, or publicly display this document to the extent required by the Patent Laws embodied in Title 35, United States Code. However, Novient, Inc. reserves all other rights whatsoever in the copyright material herein disclosed.

BACKGROUND OF THE INVENTION

1. Field of the Invention

The invention is related to data access and management, or "data syncing", between local and remote servers via internetwork such as the "internet". Data remains in the databases of the servers unless access thereto is required by another server. The servers can access each other's data without the need to receive all of the data from the other server. The data in the system is thus distributed over the servers rather than "pushing" the data around the servers so that all servers have the same data, or providing a central server the stores all data for all servers.

2. Description of the Related Art

Many techniques for permitting data intercommunication between servers and their databases via an internetwork are known. One is the "push" technique that transmits data updates generated at any server to all other servers via the internetwork so that the servers have the same data in their databases. This technique involves pushing massive amounts of data around the internetwork. The amount of data exposed if a breach in security occurs is relatively large. In addition, the amount of time required to move such large amounts of data between servers via the internetwork absorbs considerable time and processing capability of the servers. It would be desirable to provide a method that permits data to reside at the servers where it is generated and used, and yet to provide remote access to the data to a privileged degree.

Another technique known as the "hub" technique that stores all data for all servers at one site accessed via the internetwork. However, this technique also suffers from certain disadvantages. For example, in the event of data loss at this site, no servers will be have the data for recovery thereof. In addition, the amount of processing capability required at the hub site will be relatively large, and the site equipment therefore relatively expensive. It would therefore be desirable to provide a method that allows the data to reside at the servers where such data is generated and managed, yet be accessible to other servers via the internet in a secure fashion.

Another problem related to the invention is that the data at one site may not exactly match that at another site. For example, if one wishes to find data pertaining to "newspaper advertisers" in the culture of the local site, and the culture of the remote site has no data for "newspaper advertisers" but has data for "printed media advertisers", the user at the local site can request such data at the remote site if privileged at the remote site to do so. It would be desirable to provide a method that can be used to associate local and remote data to permit enhanced accessibility of data between the sites.

SUMMARY OF THE INVENTION

This invented methods have as their objects to overcome the above-stated problems with previous techniques, and do in fact overcome such problems and attain significant advantages over the prior art.

A first method of the invention includes mapping at least one local application module to respective message type data, and storing the message type data in association with the local application module in a local database accessible to a local server. The method also includes mapping gateway account data for internetwork access to at least one remote database, to respective message type data. The remote database is accessible to at least one remote server. The method further includes storing the message type data in association with respective gateway account data in the local database. The method also includes mapping remote attribute data to local attribute data, storing the remote attribute data in association with the local attribute data in a memory location of the local database accessible to the local server. The local server can thus be prepared to trigger local and/or remote application modules by generating message type data of the appropriate type at the client device, and transmitting the message type data from the client device to the local server that runs the appropriate local or remote application modules, based on such message type data, optionally with local attribute data supplied by the user. For example, the message type data can designate a local application module to run to insert or delete user-specified attribute data in the local database, or can be used to post an update in attribute data stored in the local server to the remote server. The message type data can also be used as a search request to cause the remote server to run its remote application module to generate result data based on user-specified search attribute data. The method can include transmitting the result data from the remote server to the local server, and from the local server to the local client device for generation of a display including the result data based thereon.

The first method can further include mapping at least one remote application module to respective message type data, and storing the message type data in association with the remote application module in the remote database. The method can also include mapping gateway account data for internetwork access to the local database, to respective message type data, and storing the message type data in association with respective gateway account data in the remote database. The method can further include mapping local attribute data to remote attribute data, and storing the local attribute data in association with the remote attribute data in the remote database. In addition, the method can include generating message type data at a local client device, transmitting the message type data from the local client device to the local server, and receiving the message type data at the local server. The method can further include determining whether the received message type data is associated with a local application module. The local application module is run on the local server if the received message type so designates. The method can further include determining whether the message type data received from the client device is associated with gateway account data. If so, the method can include transmitting over an internetwork the message type data from the local server to the remote server using the gateway account data. The first method can include receiving the message type data at the remote server, determining whether the message type data is mapped to a remote application module in the remote database. If so, the method can include reading the remote application module from the remote database, and running the remote application module on the remote server.

The mappings of the local and remote application modules to the same message type data and the mappings of the local attribute data to the remote attribute data, permit meaningful interaction between local and remote servers even though they may be operating in very different parts of the world. For example, if the message type data generated at a local client device designates local and/or remote application modules used to execute a search request, and if the attribute data generated at the local client device that is associated with message type data identifies a particular worker data, say, "C++ programmer", the mapped associations of the local and remote application modules and the local and remote attribute data will permit searches to be conducted either locally, remotely, or both, as desired by a user, to find workers with the same or similar skills. In addition, there need be no exact match between the local worker data definition defined by the local attribute data and the remote worker data definition, so that workers with skills close to that specified by the local attribute data can be found at the remote location to staff a particular work project, for example. This is but one example of how the invention can be used to increase the capability of local and remote servers to interact, and those of ordinary skill will understand that there are numerous other useful applications of the invention. The mapping of the remote attribute data and local attribute data can be performed with a predetermined "best fit" function. For example, the remote attribute data and the local attribute data can be assigned numeric values as to relative similarity based on a SOUNDEX function, and the "best fit" function can be used to compare such numeric values to determine local attribute data within a predetermined value from the remote attribute data. The message type data can be transmitted between the local and remote servers in an eXtensible Markup Language (XML) document embedded in a hypertext transfer protocol (HTTP) message. The method can also include logging the message received at the remote server with time stamp data, receiving the result data transmitted from the remote server at the local server, logging the result data received with return time data, comparing the time stamp data with the return time data, and determining at the local server whether the result data is valid, based on the comparison. The use of time stamp data and return time data can be used to eliminate result data that is too aged to be of interest to a user. To ensure security of the data transmitted between the local and remote servers, the method can include encrypting messages containing message type data, attribute data, and/or result data transmitted between the local and remote servers, and decrypting received messages at the receiving server. Such encryption/decryption can be performed using public and private key data prestored in association with respective network addresses (e.g., universal resource locators (URLs)) on the network.

These together with other objects and advantages, which will become subsequently apparent, reside in the details of construction and operation as more fully described hereinafter, reference being made to the accompanying drawings, forming a part hereof, wherein like numerals refer to like parts throughout the several views.

BRIEF DESCRIPTION OF THE DRAWINGS

FIGS. 3A and 3B are block diagrams of the modules and functions used to perform the invented methods; and FIGS. 4A–4H are flowcharts of a second method of the invention.

DESCRIPTION OF THE PREFERRED EMBODIMENTS

1. The General System

Figure 1:
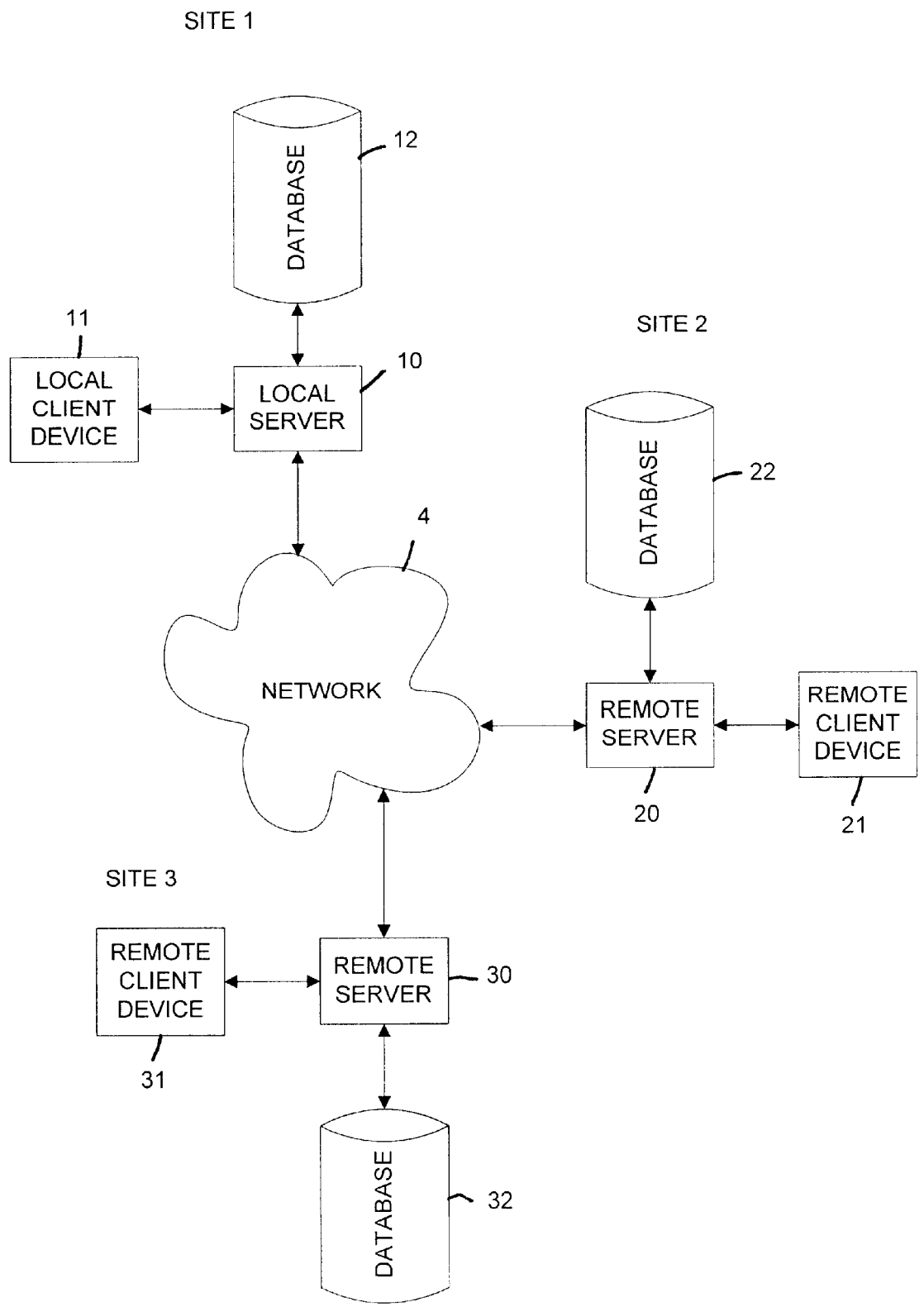
FIG. 1 is a view of a system to which the invented methods can be applied.

FIG. 1 shows a system to which the invented methods can be applied. As shown in FIG. 1, the system includes a local site 1, and one or more remote sites (two remote sites 2, 3 are shown in FIG. 1) intercoupled via an internetwork 4. Such sites 1, 2, 3 could be, for example, be located at relatively great distances from one another, possibly on different continents. The server sites could be operated by one business or separate organizations. The local site 1 includes a local client device 11, a local server 10, and a local database storage unit 12. The local server 10 is coupled to the client device 11, the database storage unit 12, and the internetwork 4. The local client device 11 can be configured as a personal computer or alternatively can be a so-called thin client with relatively little or no data processing capability. The client device 11 provides the user interface that permits a local user to view a display, listen to sounds, etc. generated by the hypertext mark-up language (HTML) or extensible mark-up language (XML) document made available to the client device by the server 10. The local server 10 can be any of a wide variety of commercially-available servers. The database storage unit 12 can be a hard-disk storage unit commercially-available from numerous sources. The remote site 2 includes remote server 20, remote client device 21, and remote database storage unit 22. The site 3 includes a remote server 30, a remote client device 31, and a database storage unit 32. The sites 2, 3 are configured and operate similarly to the site 1.

Figure 2A:
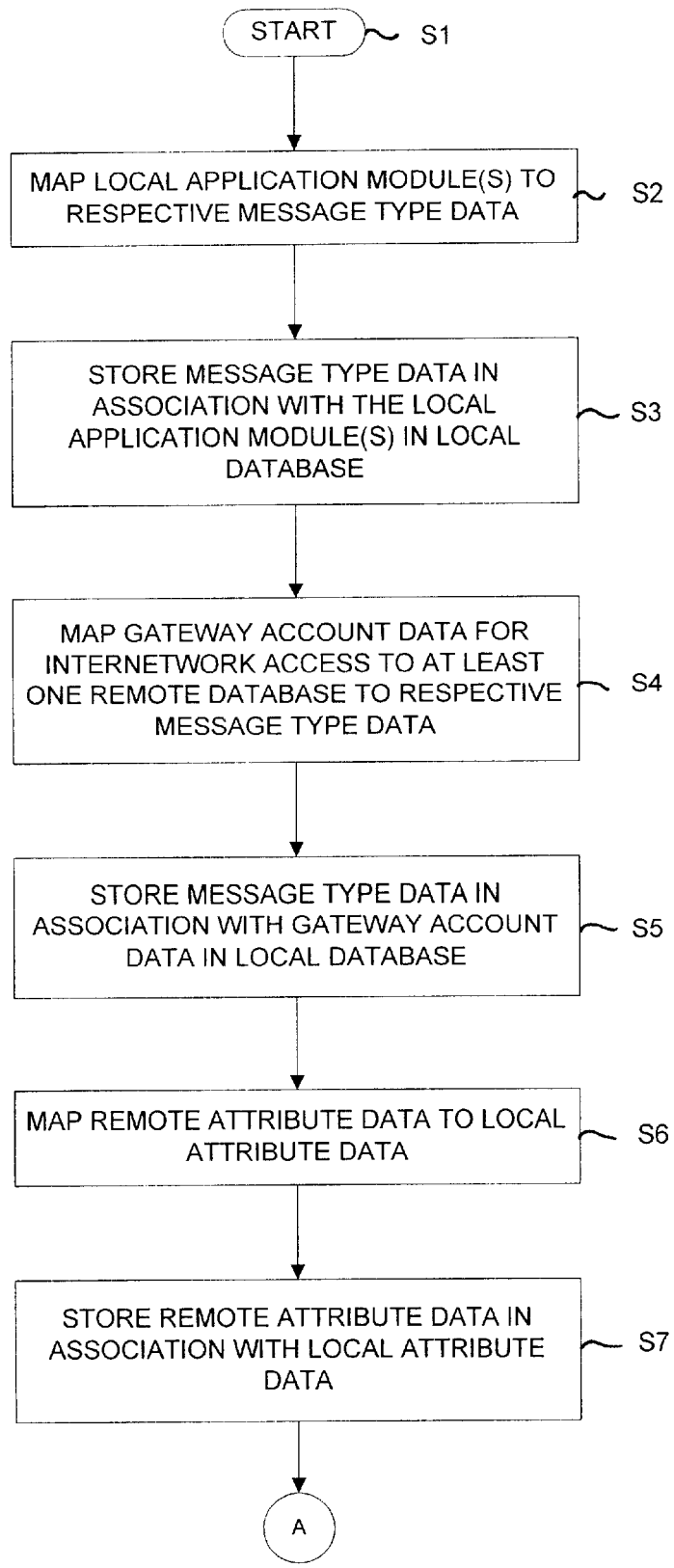
FIGS. 2A and 2B are flowcharts of a first method for mapping local and remote application modules to message type data, and for mapping local and remote attribute data used by the local and remote application modules.
Figure 2B:
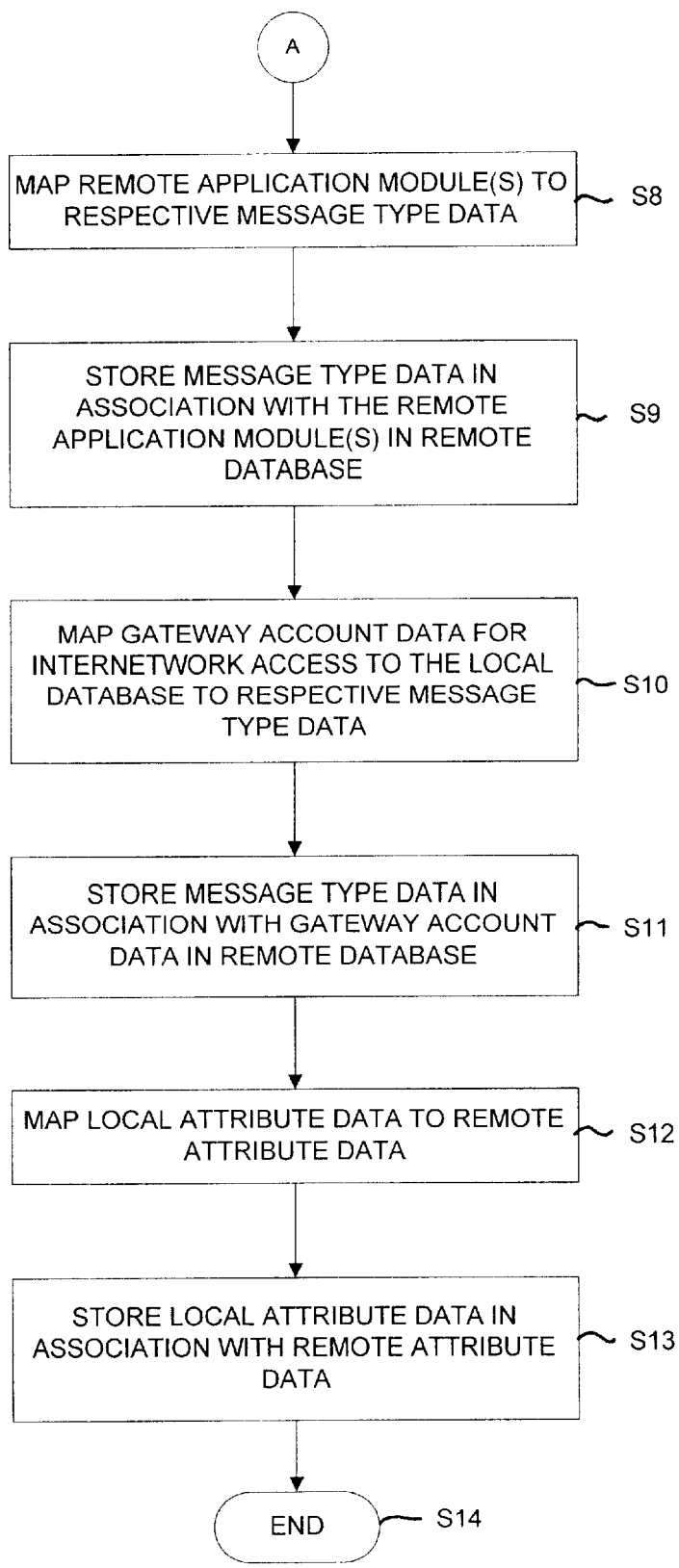

The internetwork 4 couples the servers 10, 20, 30. The internetwork 4 can be the "internet" or "world wide web", for example. Through standard TCP/IP connections, the local client device 11 can communicate with remote servers to affect actions to access data stored in remote database in units 22, 32, or notify remote servers of updates in the local database stored in the database storage unit 12. The local client device 10 thus has no control over the data stored in the remote databases, but can interact therewith to access data if privileged to do so at the remote databases. The converse is true from the perspective of the remote client devices 21, 31 vis-à-vis the local server 10 and local database 12. More specifically, the remote client devices 21, 31 can access data stored in the local database in unit 12 if privileged to do so, or may notify the local server of updates in the remote databases in respective units 22, 32. The ability of the servers 10, 20, 30 to interact is established by mapping message type data generated by the client devices 11, 21, 31 to corresponding local and remote application modules run by their respective servers. In addition, local and remote attributes if required by the type of local or remote application module to be run, are also mapped so that the local server can interpret what the remote attributes represent in terms of its own local attributes, and the remote servers can interpret the local attributes in terms of their own remote attributes. Therefore, if the local and remote application modules affect searches of respective databases and the local attribute data designates a worker data such as a "grocery store clerk" the remote database will be able to interpret the local attribute data to its remote attribute such as "store tender" even though the culture of remote servers' location may not have a worker data that exactly matches that designated by the local attribute data. A method that accomplishes preparation of the local and remote servers to interact and share data is set forth in FIGS. 2A–2B.

2. Method to Prepare Local and Remote Databases for Interactivity and to Share Data In FIG. 2A, the method of preparing the local and remote databases to permit communication between respective servers begins in step S1. In step S2, the local application module(s) are mapped to respective message type data. This step is generally carried out by a programmer familiar with the local database at the local site 1. For example, the message type data can include insert-data, update-data, remove-data, send-all-data, or send-all-matching-data commands that are carried out by respective local application modules. In step S3, the message type data is stored in association with the local application module, or more specifically, the memory location thereof, in the local database in the unit 12 by the local server 10. In step S4, gateway account data for secured access via the network 4 to remote database(s) 22, 32, are mapped to respective message type data. This step is generally performed by a skilled programmer at the local site 10. The programmer basically programs the mapping of the gateway account data to the message type data based on the message type data. For example, the updatedata, send-all-data command, or send-all-matching data commands can be mapped to gateway account data if the update would be useful for the remote databases or result data sought resides in the remote databases 22, 32. In step S5, the message type data are stored in association with the gateway account data in the local database in the unit 12. In step S6, remote attribute data is mapped to local attribute data. This step can be performed by a person having knowledge of the local and remote attribute data and their relation. This step can also be performed using a SOUNDEX function developed by the National Archives, Washington, D.C. that ranks each remote attribute data with respect to the relative closeness to the local attribute data, and a "best fit" method that determines the local attribute data with the highest rank(s) to be closest to the remote attribute data. In step S7, the remote attribute data is stored in the local database in association with the local attribute data mapped thereto in the previous step. The local database in the unit 12 is thus prepared to communicate with the remote server(s) 20, 30. In step S8 of FIG. 2B, the remote application module(s) are mapped to respective message type data. In step S9 the message type data is stored in association with the remote application module(s) in the remote database(s) stored in unit(s) 22, 32. In step S10, the gateway account data for internetwork access to the local database stored in the unit 12, is mapped to respective message type data. In step S12, the local attribute data is mapped to the remote attribute data, and in step S13, the local attribute data is stored in the remote database(s) of either one or both units 22, 32. In step S14 of FIG. 2B the method of FIGS. 2A and 2B ends.

3. Method for Operatively Interacting and Sharing Data amongst Local and Remote Databases The method for using the mapping between the local and remote application modules and the message type data, and the mappings between the local and remote attribute data used in respective local modules, is now described with reference to FIGS. 3A and 3B and FIGS. 4A–4H. The action that is affected by the methods of FIGS. 3A and 3B and FIGS. 4A–4H is exemplary only and describes a particular situation in which the message type data is a request for data such as a data-send-all or data-match-send-all command because such command uses the fillest resources in terms of attributes and functions required to transmit and respond to such commands. However, other command forms such as data-insert, data-remove, and data-update will be readily understood from this description because their general action is similar to the first part of the method disclosed in FIGS. 3A and 3B and FIGS. 4A–4H although by their nature these commands terminate without the need to transmit a response. Hence such commands parallel the first part of the method disclosed in FIGS. 3A and 3B, and FIGS. 4A–4H. In FIGS. 3A and 3B the signals passed between the various elements are number so that the sequence of steps will be more readily understood.

Figure 4B:
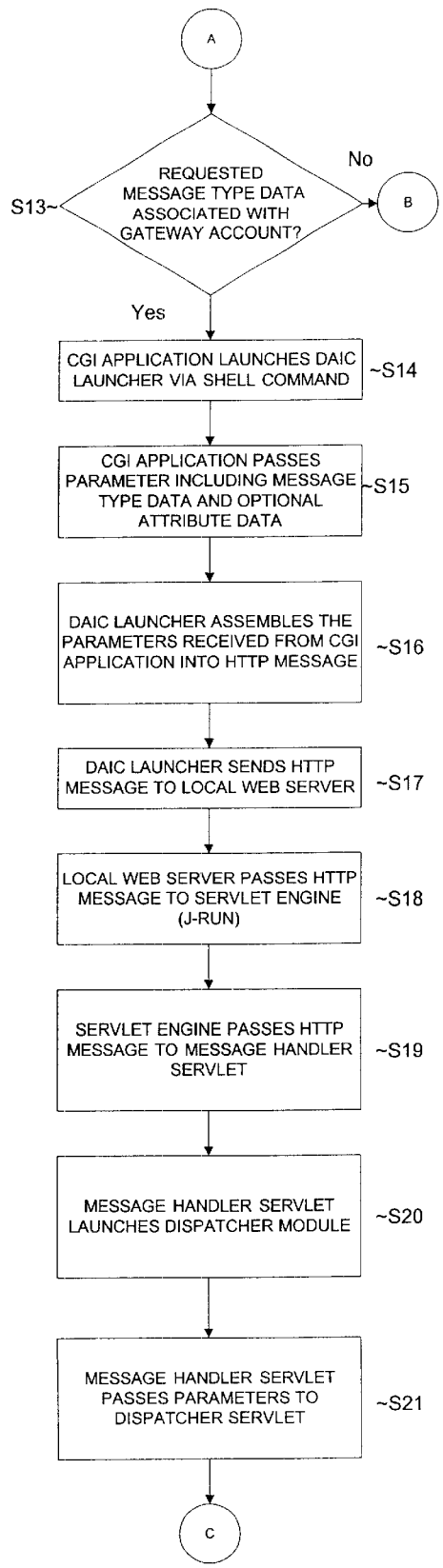
Figure 4C:
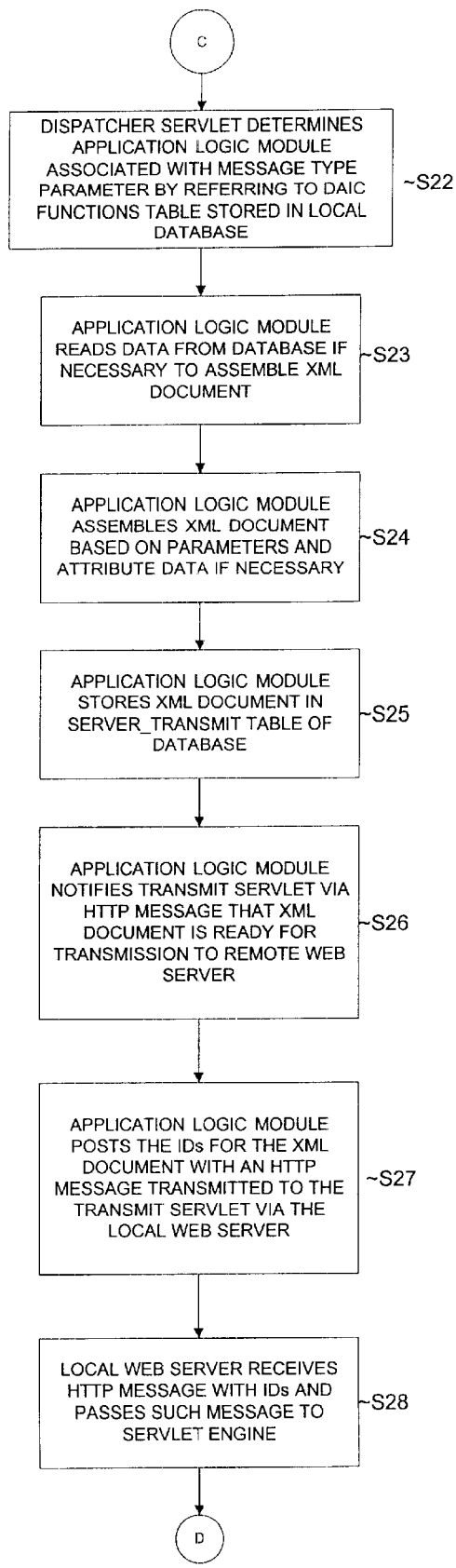
Figure 4E:
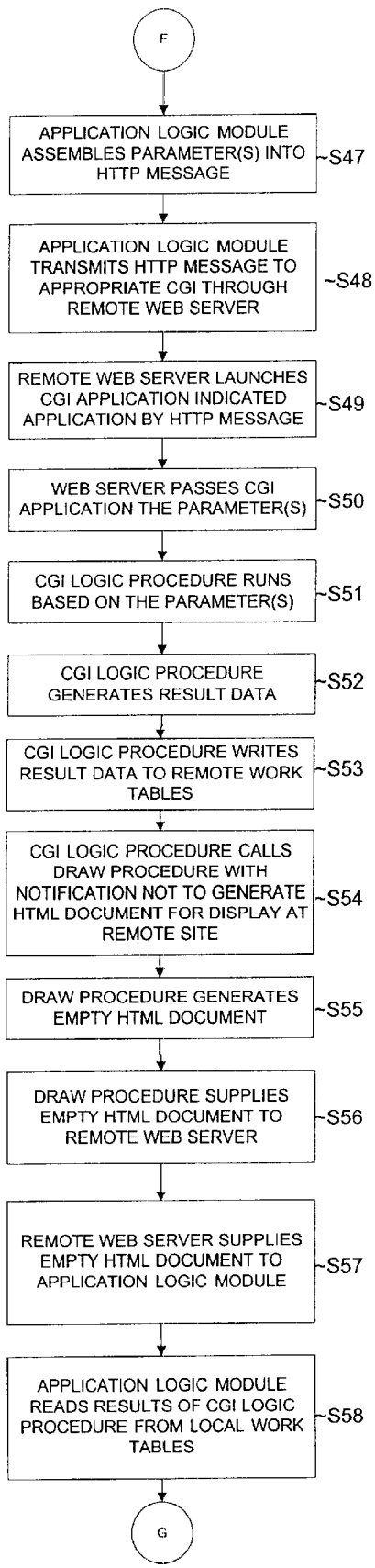
Figure 4F:
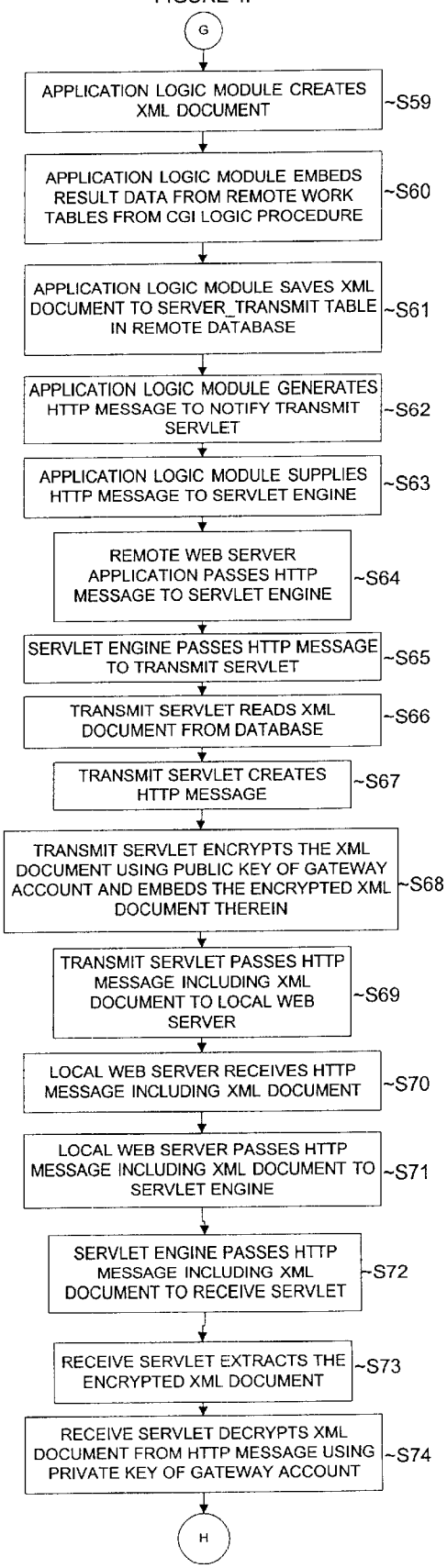
Figure 4H:
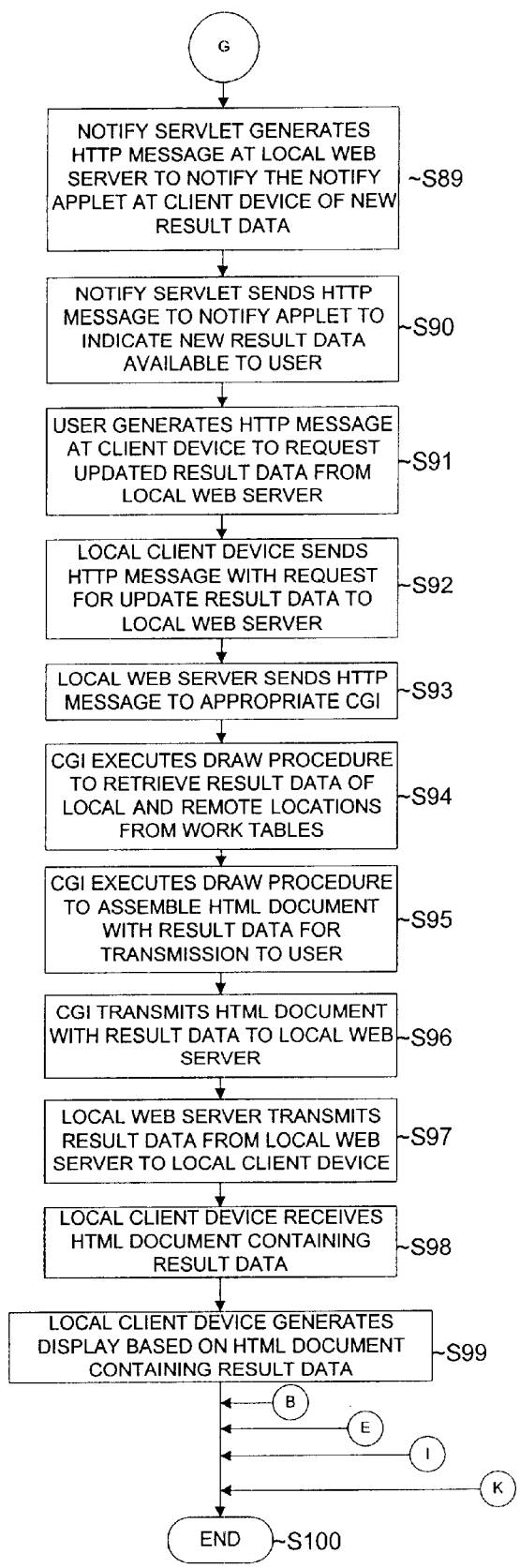

In step S1 the method of FIG. 4A begins. In step S2 of FIG. 4A, the user generates a request message for data via the user interface provided by the local client device 11. The request includes as parameters message type data specifying a local and/or remote application module to be launched based thereon. The request can also include as a parameter attribute data if appropriate to the local or remote application specified by the remote attribute data. The request message can be generated with a requesting web page 50. In step S3 the message type data and optional attribute data are transmitted in the request message from the local client device 11 to the local web server 10. The request message can be transmitted between the local client device 11 and the local web server 10 via the internetwork 4 or a local-area network (LAN) or other network link. In step S4, the message type data and optional attribute data included within the request message are received at the local web server 10, or more specifically, the local web server application module 51. In step S5, the local web server 10 refers to the local database (not shown in FIGS. 3A and 3B) and launches the common gateway interface (CGI) application 52 associated with the message type data included within the request generated at the client device 11 (as established by performance of steps S2 and S3 in FIG. 2A). In step S6 the local web server 10 executes the logic procedure 53 and writes the result data resulting therefrom to local work tables in the local database. In step S7, the logic procedure 53 calls draw procedure 54 to generate HTML document based on the result data, to be sent back the local client device 11 for the user. In step S8 the CGI draw procedure reads data from the local work tables store in the local database. In step S9 the CGI draw procedure generates the HTML document based on the result data from the local work tables. In step S10 the CGI draw procedure passes the HTML document to the application 51 of the local web server 10. In step S11 the local web server 10 passes the response HTML document back to the local client device 11 via HTTP. In step S12 the client device 11 generates a display of the local result data for the request supplied by the user. In step S13 of FIG. 4B, during execution of the CGI logic procedure 53, the CGI application 52 determines whether the message type data included within the request message from the local client device 11 is associated with gateway account data. If so, in step S14 the CGI application 51 launches DAIC launcher 55 via a shell command. In step S15 the CGI application 52 passes the DAIC launcher 55 parameters including the message type data and optionally also the attribute data if included therein. In step S16 the DAIC launcher 55 assembles the parameters receive from the CGI application into an HTTP message. In step S17 the DAIC launcher 55 sends an HTTP message to the local web server application 51 including the message type data and optional local attribute data as parameters. In step S18 the local web server application 51 passes the HTTP message to servlet engine 56 ("j-run"). In step S19 the servlet engine 56 passes HTTP message to message handler servlet 57. In step S20 the message handler servlet passes parameters of message to dispatcher servlet 58. In step S21 the dispatcher servlet 58 determines remote application logic module 59 associated with associated with message type parameter by referring to DAIC functions table stored in the local database. In step S22 the application logic module 59 reads data from the local database if needed to assemble XML document. In step S23 the application logic module 59 assembles the XML document document based on parameters and attribute data if necessary. In step S24 the application logic module 59 stores the XML document in the server_transmit table in the local database. In step S25 the application logic module 59 stores the XML document in the server_transmit table of the local database. In step S26 the application logic module 59 notifies the transmit servlet 60 via HTTP message that the XML document is ready for transmission to remote web server 20 (for simplicity the corresponding description of what transpires in the site 3 is not presented since it mirrors the steps in the site 2). In step S27 the application logic module 59 posts the IDs for the XML document with an HTTP message transmitted to the transmit servlet 60 via the local web server application 51. In step S28 the local web server application 50 receives the HTTP message with IDs and passes such message to the servlet engine 56. In step S29 of FIG. 4D the servlet engine 56 passes the HTTP message to the transmit servlet 60. In step S30 the transmit servlet 60 retrieves the XML document using IDs from the local database. In step S31 the transmit servlet 60 encrypts the XML document with a public key associated with the gateway account. In step S32 the transmit servlet 60 attaches the encrypted XML document to the HTTP message. In step S33 the transmit servlet 60 transmits the HTTP message including the encrypted XML document to the remote web server 20. In step S34 the remote server 20, or more specifically its application 61, receives the HTTP message with the encrypted XML document including the message type data and optional attribute data as parameters. In step S35 the remote server application 61 passes the received HTTP message to the servlet engine 61. In step S36 the servlet engine 62 passes the HTTP message to the receive servlet 63. In step S37 the receive servlet 63 extracts the encrypted XML document from the HTTP message. In step S38 the receive servlet 63 decrypts the XML document using private key data corresponding to the gateway account. In step S39 the receive servlet 63 saves a copy of the XML document in a server_receive table stored in the remote database in the unit 22. In step S40 the receive servlet 63 passes the XML document to dispatcher module 64. In step S41 the dispatcher module 64 reads message type data from the XML document. In step S42 the dispatch module 64 checks return type message for the timeout value. In step S43 the dispatcher module 64 determines whether the message has timed out. If not, in step S44 the dispatcher module 64 reads the remote application module for the message type data from the remote database (such association is made in steps S8 and S9 of FIG. 2B). In step S45 the dispatcher module 64 launches the application module 65. In step S46 the application logic module 65 extracts parameter (s) including the message type data and optional attribute data from the XML document. In step S47 of FIG. 4E, the application logic module 65 assembles parameter(s) into an HTTP message. In step S48 the application logic module 65 transmits the HTTP message to the appropriate CGI application 66 indicated by message parameters. In step S49 the remote web server application 61 launches the CGI application 66 indicated by the HTTP message. In step S50 the remote web server 61 passes CGI application 66 the parameters contained in the message. In step S51 the CGI logic procedure 67 runs based on the parameters passed thereto. If necessary for the message type the CGI logic procedure 67 will translate the translate the local attribute data into corresponding remote attribute data (as established in steps S12 and S13 of FIG. 2B). In step S52 the CGI logic procedure generates result data. In step S53 the CGI logic procedure writes result data to remote work tables in the remote database. In step S54 the CGI logic procedure calls the draw procedure 68 with notification not to generate HTML document for display at the remote site 2. In step S55 the draw procedure 68 generates an empty HTML document to remote web server application 61. In step S56 the draw procedure 68 supplies the empty HTML document the remote web server application 61. In step S57 the remote web server application 61 supplies the empty HTML document to the application logic module 65. In step S58 the application logic module 47 reads result data generated by the CGI logic procedure 67 from remote work tables stored in remote database in the unit 22. In step S59 of FIG. 4F the application logic module 65 creates an XML document. In step S60 the application logic module 65 embeds result data from local work tables stored in the remote database in the unit 22. In step S61 the application logic module 65 saves the XML document to a server_transmit table in the remote database. In step S62 the application logic module 65 generates an HTTP message to notify transmit servlet that a message is ready to be sent. In step S63 the application logic module 65 passes the HTTP message to the remote web server application 61. In step S64 the remote web server application 61 passes the HTTP message to the servlet engine ("j-run") 62. In step S65 the servlet engine 62 passes HTTP message to transmit servlet 69. In step S66 the transmit servlet 69 reads the XML document from the remote database stored in the unit 22. In step S67 the transmit servlet 69 creates an HTTP message. In step S68 the transmit servlet 69 encrypts the XML document using the public key data for the gateway account to be used to respond to request message from the local server 10, and the transmit servlet 69 embeds the encrypted XML document in the HTTP message. In step S69 the transmit servlet transmits the HTTP message including the encrypted XML document from the remote server 20 over the internetwork 4 to the local web server 10. In step S70 the local web server 10, or more specifically the local web server application 51, receives the HTTP message including the encrypted XML document from the remote server 20. In step S71 the local web server 10 passes the encrypted XML document to the servlet engine 56. In step S72 the servlet engine 56 passes the HTTP message including encrypted XML document to the receive servlet 70. In step S73 the receive servlet 70 extracts the encrypted XML document from the HTTP message. In step S74 the receive servlet 70 decrypts the XML document using the private key for the gateway account associated with the message type data. In step S75 of FIG. 4G the receive servlet 70 stores a copy of the decrypted document in the server_receive table of the local database in the unit 12. In step S76 the receive servlet 70 passes the XML document to the dispatcher 58. In step S77 the dispatcher 58 checks the message for timeout value. If no timeout has occurred, in step S78 the dispatcher 58 examines the message type data included within the XML document. In step S79 the dispatcher 58 launches the application logic module 71 based on the message type data. In step S80 the dispatcher 58 passes the application logic module 71 the decrypted XML document. In step S81 the application logic module 71 extracts the result data from the XML document. In step S82 the application logic module 71 stores the result data in local work tables of the local database in the unit 12. In step S83 the user determines whether update of the result data should be performed to include result data generated from the remote server 20. In general, because the time to access the local database is less than the time required to access a remote database, the user can be permitted to view local result data and request update with remote result data upon availability thereof. If no update is requested, the application logic module waits in step S84 for a predetermined period of time such as a tenth of a second or less before checking for an update requests again in step S83. If the user requests an update with the remote result data in step S83, in step S85, the notify applet 72 registers itself with the notify servlet 73. In step S86 the notify servlet polls the local work tables in the local database for new result data as it arrives from remote server 20. In step S87 the notify servlet 73 determines whether new result data has arrived from the remote server 20. If not, in step S88, the notify servlet 73 generates and transmits an error message to the notify applet 72 that in turn receives and generates an error message to the user via the user interface of the local client device 11. On the other hand, if the determination of step S87 establishes that new result data is available, in step S89 of FIG. 4H the notify servlet 73 generates an HTTP message at the local web server 10 to notify the notify applet 72 on the web page 74 at the local client device 11 of the new result data. In step S90 the notify servlet 73 sends the HTTP message to the notify applet 72 to indicate that new result data available to the user. In step S91 the user generates an HTTP message at the local client device 11 to request updated result data from the local web server 10. In step S92 the local client device 11 sends an HTTP message with request for update with new result data to the local web server application 51. In step S93 the local web server application 51 sends the HTTP message to a corresponding CGI application 52. In step S94 the CGI application 52 executes a draw procedure to retrieve result data for local and remote sites 1, 2 from the local work tables stored in the database. In step S95 the CGI application 52 executes the draw procedure to assemble the HTML document with new result data for transmission to user. In step S96 the CGI application transmits the HTML document with the result data to the local web server application 51. In step S97 the local web server application 51 transmits the HTML document including the new result data to the local client device 11. In step S98 the local client device 11 receives the HTML document including the result data. In step S99 the local client device 11 generates a display for the user via its user interface and the received HTML document including the result data. If the determination in step S13 is negative, the determinations in steps S43 or S77 are affirmative, or after performance of steps S88 or S99, the method FIGS. 4A—4H ends in step S100.

Although the method of FIGS. 4A—4H has been described with respect to a request message because it involves the full range of possibilities as to use of the message type data, attribute data, and result data, it should be appreciated that other message types can be used to generate other actions. For example, in addition to data request message types such as data-sendall or data-match-send-all commands to which the method of FIGS. 4A—4H is applicable, steps S1—S12 of such method can be applied to local data-insert or data-remove commands with the appropriate CGI application 52. In typical applications remote data-insert or data-remove commands would not be permitted by the operators of the remote sites 1, 2 although there is no absolute prohibition that this be so. Steps S1—S51 of the method can be used to post an update in the local attributes to be included or removed in the local database and remote database in the unit 22 can be "synced" with the local database. Steps S13–S51 or S3–S100 can be used to affect command actions that have no local action to be affected by a local application module, steps S13–S51 used for a non-response message type, and steps S13–S100 used for a response message type. Other message types and corresponding local and/or remote application modules will readily occur to those skill in this art. In addition, a remote user can access the local site using message type data and optional remote attribute data in a reciprocal manner to the methods described hereinabove with respect to the local user.

The many features and advantages of the present invention are apparent from the detailed specification and thus, it is intended by the appended claims to cover all such features and advantages of the described methods which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

What is claimed is:

1. A method comprising the steps of:
   a) mapping at least one local application module to respective message type data;
   b) storing the message type data in association with the local application module in a local database accessible to a local server;
   c) mapping gateway account data for internetwork access to at least one remote database, to respective message type data, the remote database accessible to at least one remote server;
   d) storing the message type data in association with respective gateway account data in the local database;
   e) mapping remote attribute data to local attribute data; and
   f) storing the remote attribute data in association with the local attribute data in the local database, the local database accessible to the local server.

2. A method as claimed in claim 1, further comprising the steps of:
   g) mapping at least one remote application module to respective message type data;
   h) storing the message type data in association with the remote application module in the remote database;
   i) mapping gateway account data for internetwork access to the local database, to respective message type data;
   j) storing the message type data in association with respective gateway account data in the remote database;
   k) mapping local attribute data to remote attribute data; and
   l) storing the local attribute data in association with the remote attribute data in the remote database.

3. A method as claimed in claim 2, further comprising the step of:

m) generating message type data at a local client device;

n) transmitting the message type data from the local client device to the local server;

o) receiving the message type data transmitted in the step (n) at the local server;

p) determining whether the message type data received in the step (o) is associated with a local application module;

q) running the local application module if the step (p) determines that the message type data is associated with the local application module;

r) determining whether the message type data received in the step (o) is associated with a gateway account data;

s) transmitting over an internetwork the message type data from the local server to the remote server using the gateway account data, if the step (r) determines that the message type data is associated with the gateway account data;

t) receiving the message type data at the remote server;

u) determining whether the message type data is mapped to a remote application module in the remote database;

v) reading the remote application module from the remote database if the step (u) determines that the message type data is mapped to the remote application module; and w) running the remote application module on the remote server.

4. A method as claimed in claim 3, wherein attribute data is generated at the client device in the step (m) in association with the message type data, the attribute data is transmitted from the client device to the local server in the step (n), the attribute data is received at the local server in the step (o), and is transmitted from the local server to the remote server in the step (s), the method further comprising the steps of:

x) reading remote attribute data mapped to the local attribute data received in the step (s) from the remote database for use by the remote application module running in the step (w).

5. A method as claimed in claim 4, wherein the running of the remote application module in the step (w) generates result data, further comprising the step of:

y) transmitting the result data from the remote server to the local server over the internetwork;

z) receiving the result data at the local server;

aa) transmitting the result data from the local server to the local client device;

ab) receiving the result data at the local client device; and ac) generating a display on the local client device, based on the result data received in the step (ab).

6. A method as claimed in claim 4, wherein the remote application module performs a search of the remote database for worker data type designated by the attribute data.

7. A method as claimed in claim 3, wherein the local application module performs a search of the local database for worker data type designated by the attribute data.

8. A method comprising the steps of:

a) mapping at least one local application module to respective message type data;

b) mapping at least one remote application module to respective message type data;

c) generating message type data at a client device;

d) transmitting at least message type data from the client device to a local server;

e) receiving the message type data transmitted in the step (d) at the local server;

f) determining at the local server the application program module designated to be run, based on the message type data received in said step (e);

if the message type data is determined in said step (f) to be associated with a local application program module, g) running the local application program module on the local server; and if the message type data is determined in said step (f) to be associated with a remote application program module, h) transmitting at least the message type data from the local server to the remote server over an internetwork;

i) receiving the message type data at the remote server; and j) running the remote application program module on the remote server, based on the message type data received in said step (i).

9. A method as claimed in claim 8, further comprising the steps of:

k) mapping the remote attribute data to the local attribute data;

l) storing the remote attribute data in association with the local attribute data in the local database;

m) mapping the local attribute data to the remote attribute data; and n) storing the local attribute data in association with the remote attribute data in the remote server.

10. A method as claimed in claim 9, wherein said step (c) includes generating predetermined user-specified local attribute data from the client device to the local server, the local server using the local attribute data in the local application program module in the performance of said step (g).

11. A method as claimed in claim 10, wherein the remote attribute data and local attribute data are mapped in at least one of said steps (k) and (m) with a predetermined "best fit" function.

12. A method as claimed in claim 11, wherein the remote attribute data and the local attribute data are assigned numeric values as to relative similarity based on a SOUNDEX function, and the "best fit" function compares the assigned numeric values to determine local attribute data within a predetermined value from the remote attribute data.

13. A method as claimed in claim 8, wherein the message type data is transmitted said steps (d) and (h) as an extensible Markup Language (XML) document.

14. A method as claimed in claim 8, further comprising the step of:

k) generating a message including the message type data generated in said step (c), for transmission in said step (d), the message generated to include header and data sections, the header section including the destination data designating a predetermined network address of the remote server, message type data, local user data, and return trip data, the data section content based on the message type data.

15. A method as claimed in claim 14, wherein the user generates attribute data in addition to the message type data in the step (c), the message type data in the step (c) designating a search request, and the data section of the message includes attribute data for performance of the search request.

16. A method as claimed in claim 15, wherein the attribute data indicates at least one of worker data identification data and worker availability data, and the result data indicates corresponding worker data identification data and worker availability data resulting from searching a local database with the local server based on the search parameter data.

17. A method as claimed in claim 14, wherein the attribute data includes predetermined user-specified attribute data, and wherein the running of the application program module in said step (g) generates result data based on the user-specified attribute data, the method further comprising the step of:
   l) transmitting the result data from the local server to the client device; and
   m) generating a display on the client device, based on the result data.

18. A method as claimed in claim 14, wherein the message type data transmitted in said step (g) designates a search, and the performance of said step (g) generates result data, the method further comprising the step of:
   l) generating a response message having header and data sections, the header section including network address data designating the local server, message type data, local user data, and return trip data, the data section including the result data; and
   m) transmitting the response message from the remote server to the local server.

19. A method as claimed in claim 18, further comprising the step of:
   n) logging the message received at the remote server in the step (i) with time stamp data;
   o) receiving the result data transmitted from the remote server in the step (m) at the local server;
   p) logging the result data received in the step (o) with return time data;
   q) comparing the time stamp data with the return time data; and
   r) determining at the local server whether the result data is valid, based on the comparison of the step (q).

20. A method as claimed in claim in claim 17, wherein the response message is generated in said step (l) to be encrypted based on a public key for the local server stored in association with the network address of the local server in the remote database, and wherein the encrypted response message is transmitted in the step (m), the method further comprising the step of:
   n) decrypting the response message at the local server based on predetermined private key data prestored in association with the public key data.

21. A method as claimed in claim 14, wherein the generating is performed in said step (k) to encrypt the message using a public key prestored in the local database in association with the destination address of the remote server, and wherein the message is received in the step (i), the method further comprising the step of:
   l) reading from the remote database private key data prestored in association with the network address data for the local server; and
   m) decrypting the message from the local server at the remote server, based on the private key data.

22. A method as claimed in claim 8, wherein the attribute data includes predetermined user-specified attribute data, and wherein the running of the application program module in said step (j) generates result data based on the user-specified attribute data, the method further comprising the step of:
   k) transmitting the result data from the remote server to the local server;
   l) transmitting the result data from the local server to the client device; and
   m) generating a display on the client device based on the result data.

23. A method as claimed in claim 22, wherein the attribute data includes at least one of worker data identification data and worker availability data, and the result data indicates corresponding worker data identification data and worker availability data resulting from searching the remote database with the remote server based on the attribute data.

24. A method as claimed in claim 8, wherein the attribute data includes predetermined user-specified search parameter data, and wherein the running of the application program module in said step (j) generates result data based on the user-specified attribute data, the method further comprising the step of:
   k) transmitting the result data from the remote server to the local server;
   l) transmitting the result data from the local server to the client device; and
   m) generating a display on the client device based on the result data.

25. A method as claimed in claim 8, wherein the attribute data includes at least one of worker data identification data and worker availability data, and the result data indicates corresponding worker data identification data and worker availability data resulting from searching the remote database with the remote server based on the attribute data.

26. A method as claimed in claim 8, wherein the gateway account data is transmitted to the remote server via the local server, and wherein the remote server generates result data based on the performance of said step (j), the method further comprising the steps of:
   k) transmitting the result data from the remote server to the local server using the gateway account data; and
   l) transmitting the result data from the local server to the client device using the gateway account data.

27. A method as claimed in claim 8, wherein said step (c) is performed using a hypertext transfer protocol (HTTP) POST request.

28. A method as claimed in claim 8, wherein the local application module is a common gateway interface (CGI) application program module.

* * * * *